(12) United States Patent
Ohuchi

(10) Patent No.: US 6,520,655 B2
(45) Date of Patent: Feb. 18, 2003

(54) LIGHTING DEVICE

(75) Inventor: Masatoshi Ohuchi, Saitama (JP)

(73) Assignee: Top Electronic Corporation, Kawaguchi (JP)

( * ) Notice: Subject to any disclaimer, the term of this patent is extended or adjusted under 35 U.S.C. 154(b) by 0 days.

(21) Appl. No.: 09/866,947

(22) Filed: May 29, 2001

(65) Prior Publication Data

US 2001/0048603 A1 Dec. 6, 2001

(51) Int. Cl.[7] ................................................. F21V 7/04
(52) U.S. Cl. ........................... 362/31; 362/27; 362/558; 385/146; 385/901
(58) Field of Search ................................. 362/559, 558, 362/560, 31, 66, 27, 327, 337; 385/901, 47, 48, 36, 37, 146

(56) References Cited

U.S. PATENT DOCUMENTS 5,743,616 A * 4/1998 Giuliano et al. ............ 362/231
6,031,958 A * 2/2000 McGaffigan ................ 362/555

* cited by examiner

Primary Examiner—Sandra O'Shea
Assistant Examiner—John Anthony Ward
(74) Attorney, Agent, or Firm—Flynn, Thiel, Boutell & Tanis, P.C.

(57) ABSTRACT

A lighting device is provided. The lighting device has LED lamps and so forth with high directivity as light source. The lighting device of the present invention is capable of lighting more uniformly. Few labor for maintenance and inspection is necessary. Rich durability is provided therewith and it can be manufactured in low cost. The lighting device is constituted in such a way that a light source body such as LED lamp and so forth is disposed at an end portion of a cylindrical light transmitting member whose degree of transparency is transparent or translucent. The constitution causes the light to travel in the axial direction of the light transmitting member. Transparent or translucent island formation body is provided on the inside of internal surface of the light transmitting member. Islands of the island formation body are made to protrude perpendicular to the axial line of the cylindrical light transmitting member. The light emitted from the light source body is irregularly reflected while striking to these islands. For that reason, more even illuminating light is given at the peripheral surface of the light transmitting member to be the light ejecting surface.

13 Claims, 2 Drawing Sheets

LIGHTING DEVICE

BACKGROUND OF THE INVENTION

1. Field of the Invention

The present invention relates to a lighting device using a light source body whose directivity or straight-progress property is high such as LED lamp and so forth in which light emitted from the LED element (light-scattering diode) is taken to be a light source.

2. Description of the Related Art

LED lamps have advantages. The LED lamp differs from general electric light bulb that uses a filament. The LED lamp does not have malfunction that the filament has burnt out caused by disconnection of the filament. Therefore the LED lamp is long life. The LED lamp requires almost few labor for maintenance. The LED lamp is low power consumption. Consequently, in these days, the LED lamp is used as a light device for nighttime illumination of an outdoor device mainly such as road signs, and various kinds of guide boards and so forth while utilizing such characteristics thereof. Further, as the lighting device of the same usage, the fluorescent lamps are used because it is longer life than the electric light bulb.

The LED lamps have aforementioned advantages. However, the LED lamps have a fault from the nature thereof. The LED lamp possesses high directivity or high straight-progress property. When the LED lamp is used as lighting for the guide boards and so forth, back light becomes local. For that reason, the intensity of illumination of periphery portion extremely lowers resulting in unevenness of lighting region. Setting of more LED lamps can be considered for improvement. However, problems of cost up of the whole apparatus and increase of the power consumption occur.

On the other hand, in the case of the florescent lamps, there is advantage that it is long life in comparison with the electric light bulb using the filament surely. However, change of the fluorescent lamp becomes always necessary, therefore work labor for maintenance and inspection occupies large part of the cost for facility maintenance. Further, in the case of the fluorescent lamp, length of the tube is determined, setting location undergoes limitation. When the fluorescent lamp is damaged, there is fear that buildup of the gas occurs therefrom. There is the problem when the broken pieces of the fluorescent lamp are discarded as rubbish.

SUMMARY OF THE INVENTION

The present invention has been made in consideration of the above-mentioned problem, and an object of the present invention is to provide a lighting device in which the LED lamps and so forth whose directivity is high are taken to be a light source for effectively exhibiting their advantages, further it is possible to remarkably reduce work labor of the maintenance and inspection, it has long life abounding in durability, it is possible to illuminate illumination region evenly, it is used in safety instead of the fluorescent lamp, it does not undergo limitation of setting location, it is possible to manufacture in low cost, it is light weight, in particular, it is appropriate for lighting of outdoor device and or emergency lamp.

According to a first aspect of the present invention there is provided a lighting device which comprises a light transmitting member of cylindrical hollow body in which at least part thereof is transparent or translucent, a light source for scattering a light with directivity along an axial direction toward internal space of the light transmitting member disposed at either one end or both ends of the light transmitting member, and a light scattering member disposed on the inside of internal surface of the light transmitting member in which the light is made to transfer for external part of the light transmitting member.

According to a second aspect of the present invention, in the first aspect, there is provided a lighting device wherein the light source is an LED (Light Scattering Diode) device.

According to a third aspect of the present invention, in the first aspect, there is provided a lighting device wherein the light scattering member is a transparent or translucent island formation body including a plurality of islands which are formed in such a way as to protrude toward center axial line of the light transmitting member.

According to a fourth aspect of the present invention, in the third aspect, there is provided a lighting device, wherein the islands of the island formation body are formed so that a plurality of projections are disposed with beltlike arrangement at predetermined intervals against the axial direction of the light transmitting member.

According to a fifth aspect of the present invention, in the third aspect, there is provided a lighting device, wherein the island formation body is made of silicone rubber.

According to a sixth aspect of the present invention, in the third aspect, there is provided a lighting device, wherein height of the islands is degree of 2.5 mm to 3 mm.

According to a seventh aspect of the present invention, in the first aspect, there is provided a lighting device, wherein there is provided a reflector at either one end or both ends of the light transmitting member.

According to an eighth aspect of the present invention, in the first aspect, there is provided a lighting device, wherein a solar cell is used as power supply of the light source.

In the lighting device with the aforementioned constitution of the present invention, the light strikes the islands. Part of the light reflects irregularly at the surface of the islands to be complicated while striking the neighboring islands mutually. Then, the light is concentrated or stored with respective islands as center, before lighting entirely the peripheral surface to be the light transmitting surface of the light transmitting member through the islands. For that reason, although the light transmitting surface is single light source body such as the LED lamp and so forth with directivity, the light brightly illuminates the whole of the light scattering surface approximately even.

BRIEF DESCRIPTION OF THE DRAWINGS

The various features of novelty which characterize the invention are pointed out with particularly in the claims annexed to and forming a part of this specification. For a better understanding of the invention, its operating advantages, and specific objects attained by its use, reference should be had to the accompanying drawing and descriptive matter in which there is illustrated and described a preferred embodiment of the invention.

DETAILED DESCRIPTION OF THE PREFERRED EMBODIMENT

Figure 1:
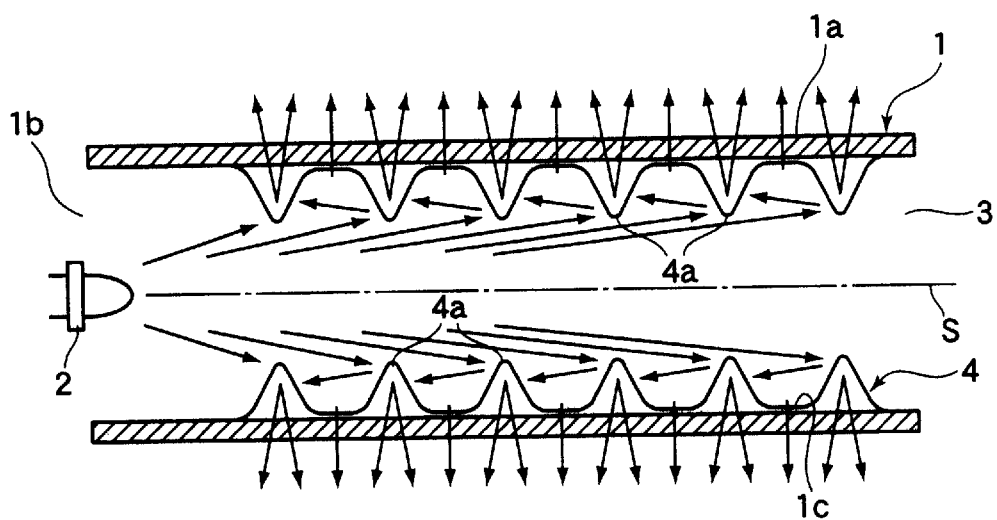
FIG.1 is a principle constitution view merely illustrated with exaggeration for explaining lighting embodiment of a lighting device according to the present invention.

A preferred embodiment of the lighting device according to the present invention will be described in detail referring to accompanying drawings below. FIG. 1 shows a principle constitution merely illustrated with exaggeration for explaining lighting embodiment of a lighting device according to the present invention. In FIG. 1, the lighting device comprises a light transmitting member 1 with cylindrical shape in which its peripheral surface 1a constitutes transparent or translucent light transmitting surface for transmitting the light, a light source body 2 of LED lamps and so forth for generating light with directivity along the axis direction within internal space 3 of the light transmitting member 1, and the light source body 2 is arranged at an opening end 1b along the axis direction (axis line S) of the cylindrical light transmitting member 1, and an island formation body 4 (as a light scattering member) which is formed on the inside of internal periphery surface 1c of the light transmitting member 1, in which the islands protruding in the radius direction are studded, which is transparent or translucent and which is directed to internal space 3 of the light transmitting member 1.

The islands 4a are illustrated in FIG. 1 with a little exaggeration for explaining, actually, height of the islands 4a is degree of 2.5 to 3.0 mm, this dimension does not depend on size of the diameter of the light transmitting member 1.

Glass or plastic is desirable for quality of the material for the light transmitting member 1. For instance, polycarbonate whose transparency, heat resistance, and winterization property are excellent is desirable. On the other hand, silicone rubber is desirable for the island formation body 4. The silicone rubber is applied on the internal periphery surface 1c of the light transmitting member 1. The silicone rubber is applied by using appropriate mechanical measures as illustrated in FIG. 1 in such a way as to form the islands 4a with beltlike protrusions in the lateral direction with predetermined intervals against the axial direction. The island formation body 4 adheres to the internal periphery surface 1c depending on its adhesive quality. At the hardened condition, it is possible to keep arrangement condition where the islands 4a are scattered about the internal periphery surface 1c. Moreover, the silicone rubber is transparent or translucent, accordingly transmission rate of the light is high. The silicone rubber possesses operation of reflecting the light at the surface thereof, thus it is the most desirable material for achieving effect of the present invention.

In the aforementioned constitution, the light emitted from the light source body 2 travels with predetermined angular range (for instance 20 degrees) toward the internal space 3 of the light transmitting member 1 along the axial direction (axial line S). As illustrated in FIG. 1, the light strikes the islands 4a. Part of the light reflects irregularly at the surface of the islands 4a to be complicated while striking the neighboring islands 4a mutually. Then, the light is concentrated or stored with respective islands 4a as center, before lighting entirely the peripheral surface 1a to be the light transmitting surface of the light transmitting member 1 through the islands 4a. For that reason, although the light transmitting surface (peripheral surface 1a) is single light source body 2 such as the LED lamp and so forth with directivity, the light brightly illuminates the whole of the light transmitting surface approximately even.

Consequently, it is possible to use the lighting device of the above constitution as the lighting device taking the place of the fluorescent lamp. Further, if the indication board with light transmission property is disposed at the outer portion of this lighting device, the aforementioned lighting device is capable of achieving the role of the back light.

Moreover, the islands 4a formed depending on the island formation body 4, as illustrated in FIG. 1, adopt the constitution in which the islands 4a with beltlike protrusions in the lateral direction with predetermined intervals against the axial direction of the light transmitting member 1 are formed at the whole internal surface 1c. If this constitution is adopted, since manufacturing is easy and lighting effect is excellent, it is the most desirable. However, the islands 4a are capable of being adopted another shape for instance, the islands 4a are disposed on the inside of the internal surface 1c of the light transmitting member 1 with dotted state at predetermined intervals.

Figure 2:
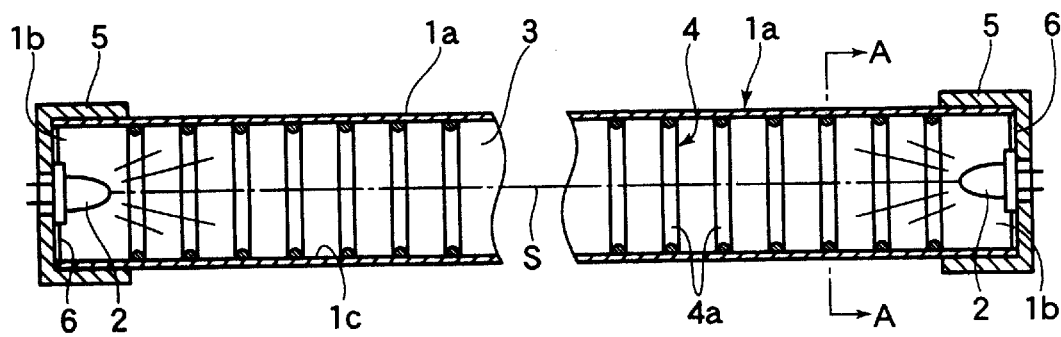
FIG.2 is a vertical sectional view along axial line direction of the first embodiment of the lighting device according to the present invention.
Figure 3:
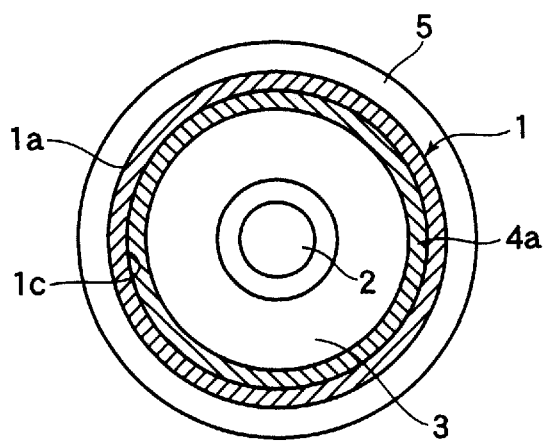
FIG.3 is an enlarged transverse cross sectional view along A—A line of FIG. 2.

FIG. 2 and FIG. 3 are views illustrating concretely the first embodiment of the lighting device of the present invention that is illustrated in FIG. 1 as a principle. Explanation is made in such a way as to add the same reference number to part corresponding to FIG. 1.

Namely, in the lighting device of the first embodiment, respective light source bodies 2 such as the LED lamps and so forth are disposed at both open ends of the cylindrical light transmitting member 1. The light source bodies 2 are mounted at both open ends of the light transmitting member 1 by caps 5. As illustrated in FIG. 3, respective light source bodies 2 are disposed so that it occupies center position of circle of the cylindrical light transmitting member 1. The island formation body 4 and the islands 4a that are formed depending thereon are the same as that illustrated in FIG. 1.

Further, a light reflector 6 is disposed on the inside of respective caps 5. Respective light reflectors 6 are in the condition where the respective light reflectors 6 face to the internal space 3 in the end portion of the light transmitting member 1. Consequently, when the light emitted from the respective light source bodies 2 is irregularly reflected at the respective islands 4a in the internal space 3, since incident light to the light reflector 6 is reflected at this surface thereof, irregular reflection of the light increases all the more, thereby lighting effect to the light transmitting surface 1a is enhanced.

Furthermore, the quality of the light transmitting member 1 and the island formation body 4 is the same as that described above.

Moreover, supply power to the light source body 2 is not illustrated. However, the solar cells can be adopted as the power supply because it is suitable that it possesses ability with small power.

Figure 4:
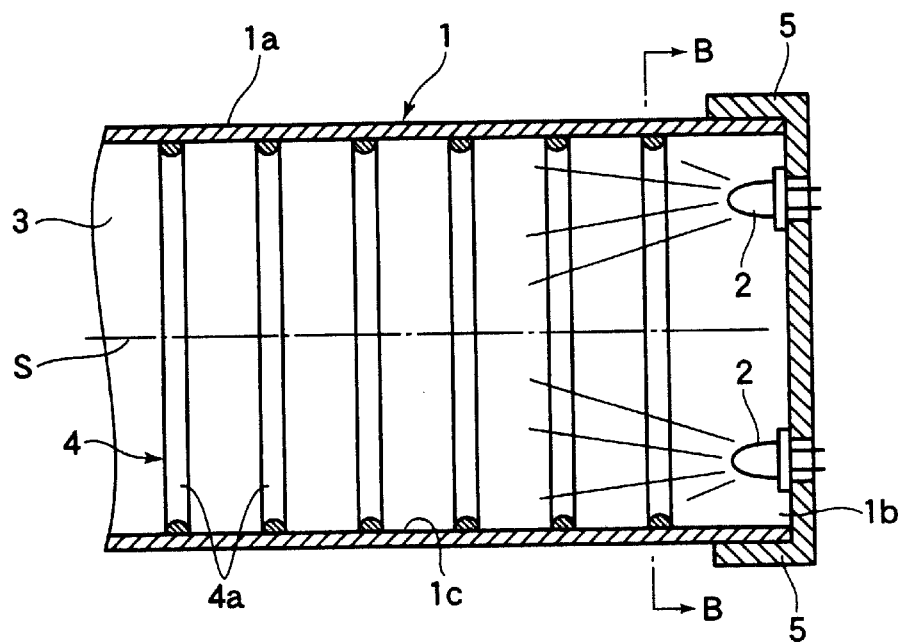
FIG. 4 is a partial rupture vertical cross sectional view along axial line direction of the second embodiment of the lighting device according to the present invention.
Figure 5:
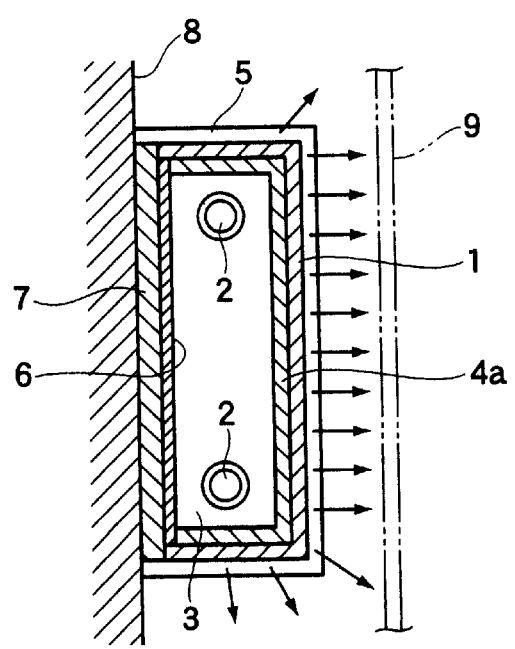
FIG. 5 is a transverse cross sectional view along B—B line of FIG. 4.

FIG. 4 and FIG. 5 illustrate the second embodiment of the lighting device of the present invention. Explanation will be made while adding the same reference numeral to part corresponding to above FIG. 1 to FIG. 3 below.

Namely, in the lighting device of the second embodiment, as particularly illustrated in the transverse sectional view of FIG. 5, cylindrical light transmitting member 1 is formed with shape in which transverse section is of rectangular shape. One side of the light transmitting member 1 is occupied by a supporting plate 7 that does not have light transmission property. The light transmitting member 1 is, for instance, mounted on the fixed wall surface 8 through the supporting plate 7. Consequently, in this case, the light transmitting surface (peripheral surface 1a) of the light transmitting member 1 corresponds to front surface and upper surface and lower surface with the exception of the supporting plate 7.

The islands 4a of the island formation body 4 are formed on the inside of internal surface 1c of the light transmitting member 1 with protruded shape in the same as that of FIG. 1 to FIG. 3. However, the islands 4a are not provided on the surface corresponding to the supporting plate 7. The light reflector 6 is disposed here.

Further, the light source bodies 2 such as the LED lamps and so forth are disposed on the open end of the light transmitting member 1 at upper and lower sides with one pair. The light source bodies 2 are mounted on the open end by the cap 5. Furthermore, it is suitable that the light reflector may be provided on the inside of the cap 5 like the first embodiment.

Thus, in accordance with the shape of the light transmitting member 1, or in the case of large sized light transmitting body 1, a plurality of light source bodies 2 are disposed. However, in the case that the shape and/or size of the light transmitting member 1 correspond to degree of the tube of the general fluorescent lamp, single light source body 2 is enough. Further, FIG. 4 illustrates one side of end portion of the light transmitting member 1. The other side is the same constitution as above. Furthermore, if length of the light transmitting member 1 is short, it is possible to adopt a constitution in which the light source body 2 is not disposed on the other side of the end portion.

Further, the quality itself of the material of the light transmitting member 1 and the island formation body 4 is the same as that described above.

In the lighting device constituted as described above, the light emitted from the respective light source bodies 2 toward the internal space 3 of the light transmitting member 1 is irregularly reflected the respective islands 4a. Further, the irregular reflection of the light is increased all the more due to the light reflector 6. This light is concentrated or stored onto the islands 4a. As illustrated in FIG. 5, this light illuminates the light scattering surface (peripheral surface 1a) of the light transmitting member 1. Thus function of the lighting device is achieved. And then, for instance, as illustrated by two-dot chain line in FIG. 5, if the indication board 9 is disposed at the front side of the light transmitting member 1, the lighting device will achieve role of the back light of the indicating board 9.

As described above, various kinds of embodiments concerning the lighting device of the present invention are explained. However, the present invention is not limited by the embodiments. For instance, it is the most desirable to form the island formation body by the silicone rubber. However, if the material possesses the same quality as the silicone rubber, the material is not limited by the silicone rubber. Further, for instance, it is possible to adopt a constitution in which the island formation body is formed to be integrated with the light transmitting member on the inside thereof.

As described above, in the lighting device according to the present invention, the island formation body in which the islands made from the silicone rubber are formed on the inside of the internal surface of the cylindrical light transmitting member is provided. In such a constitution, it is possible to eject bright illuminating light with more even from the lighting device by using the light source body such as the LED lamps and so forth with high directivity. Advantages of durability and power saving that the light source body such as the LED lamp and so forth has are maintained. Directivity or straight progress property of the light is improved. The light is capable of being diffused widely. Consequently, it is possible to provide the lighting device capable of being substituted for the fluorescent lamp. Further, it is possible to remarkably reduce work labor of the maintenance and inspection, thereby, in particular, it is appropriate for the lighting device of the outdoor device and the emergency lamp. It has long life abounding in durability, it is possible to illuminate illumination region evenly, it is used in safety instead of the fluorescent lamp, it does not undergo limitation of setting location, because there is no limitation concerning length of the light transmitting member, it is possible to determine the size freely in accordance with the setting condition. It is possible to manufacture in low cost, it is light weight. When the lighting device is damaged, there is no fear that buildup of the gas occurs therefrom. Furthermore, since there is the island formation body on the inside of the internal portion of the light transmitting member, even though the lighting device is exposed by the rain, it is difficult to suffer from the influence thereof.

While there has been described what is at present considered to be preferred embodiment of the invention, it will be understood that various modifications may be made therein, and it is intended to cover in the appended claims all such modifications as fall within the true spirit and scope of the invention.

What is claimed is:

1. In a lighting device comprising:
   a light transmitting member of cylindrical hollow body in which at least a part thereof is transparent or translucent;
   at least one LED for emitting a light with directivity along an axial direction toward an internal space of said light transmitting member, said at least one LED being disposed at either one end or both ends of said light transmitting member;
   a light scattering member disposed on the inside of an internal surface of said light transmitting member to transfer the light to an external part of said light transmitting member;
   the improvement wherein said light scattering member comprises a transparent or translucent island formation body made of silicone rubber and including a plurality of islands formed to protrude toward a center axial line of said light transmitting member and located in close proximity therewith; and
   the islands of said island formation body are formed so that a plurality of projections are disposed with belt-like arrangement at predetermined intervals against the axial direction of said light transmitting member.

2. The lighting device according to claim 1, wherein the height of said islands is from 2.5 mm to 3 mm for any diameter of said light transmitting member.

3. The lighting device according to claim 1, including a reflector at either one end or both ends of said light transmitting member.

4. A lighting device comprising:
   an elongate light transmitting member comprising a hollow cylindrical body having a cylindrical inner surface and a cylindrical outer surface, said cylindrical body defining a central axis in an axial direction along a length thereof, the central axis being equidistant from the inner surface, at least a part of said cylindrical body being transparent or translucent;

a hollow light scattering member comprising silicone rubber which is transparent or translucent for transferring light outwardly through said light transmitting member, said light scattering member being located on the internal surface of said light transmitting member, said light scattering member comprising islands of said silicone rubber disposed at predetermined intervals along the length of said light transmitting member, said islands extending about the entirety of the inner surface of said cylindrical body and projecting inwardly toward the central axis of said light transmitting member, each of said islands being formed symmetrically about the central axis; and at least one light source disposed at one end of said light transmitting member for emitting a light with directivity in the axial direction through an inner open space of said hollow light scattering member, wherein light emitted from said light source and entering the open space within said hollow light scattering member reflects from said scattering member at the islands along the length thereof, passes through said scattering member into said light transmitting member, and passes through said light transmitting member, wherein the light is dispersed outwardly along the entire length of said light transmitting member to simulate a fluorescent light.

5. The lighting device of claim 4, wherein said light source comprises a light emitting diode.

6. The lighting device of claim 4, wherein the islands project inwardly toward the central axis a distance from 2.5 mm to 3 mm for any diameter of said light transmitting member.

7. The lighting device of claim 6, including a reflector at one or both ends of said light transmitting member.

8. The lighting device of claim 4, wherein the islands projecting inwardly have a rounded tapered peak shape at an innermost surface thereof.

9. A lighting device comprising:

a rectangular supporting plate for mounting on a wall;

a hollow elongate light transmitting member having a cylindrical shaped body portion extending along the entire length thereof and an opening portion along the entire length thereof, the opening portion dimensioned to receive said rectangular support plate, at least a part of said body portion being transparent or translucent, said cylindrical body portion defining a central axis in an axial direction along a length thereof, the central axis being equidistant from an inner surface of said cylindrical body portion;

a hollow light scattering member for transferring light outwardly through said light transmitting member, said light scattering member being located on the inner surface of and extending along substantially the entire length of said cylindrical body portion of said light transmitting member, said light scattering member comprising a plurality of silicone rubber islands disposed at predetermined intervals along the length of said light transmitting member and integrally joined to adjacent ones of said islands by a layer of silicone rubber having an inner diameter less than the inner diameter of said islands, said islands extending about the inner surface portion of said cylindrical body portion in a plane perpendicular to the central axis and projecting inwardly toward the central axis of said light transmitting member;

at least one light source disposed on at least one end of said light transmitting member for emitting a light with directivity in the axial direction through an open space within said hollow light scattering member; and a reflector secured to a surface of said rectangular support plate facing said light scattering member and said transmitting member for reflecting light toward said light scattering member, wherein light emitted from said light source enters the open space within said hollow light scattering member reflects from said scattering member at said islands along the length thereof, passes through said scattering member into said light transmitting member, and passes through said light transmitting member, wherein the light is dispersed outwardly along the entire length of the cylindrical body portion of said light transmitting member and reflected by said reflector at the opening portion of said light transmitting member.

10. The lighting device of claim 9, wherein the light provides a backlight for an indicator board.

11. The lighting device of claim 9, wherein said islands project inwardly toward the central axis a distance from 2.5 mm to 3 mm for any diameter of said light transmitting member.

12. The lighting device of claim 9, including a reflector element at one or both ends of said light transmitting member.

13. The lighting device of claim 9, wherein said islands projecting inwardly each have a rounded tapered peak shape at an innermost surface thereof.

* * * * *